E. DWYER.
VALVE.
APPLICATION FILED AUG. 13, 1910.
987,447.
Patented Mar. 21, 1911.
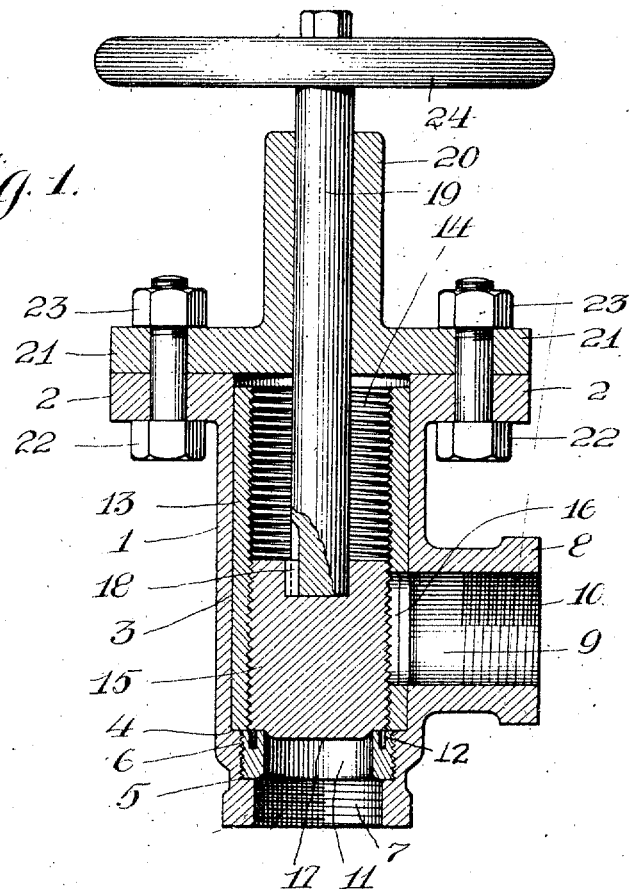
Fig. 1.
Fig. 2.
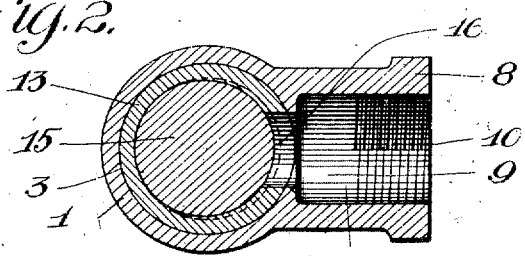
Witnesses:—
Samuel Payne.
F. H. Fuller
Inventor
E. Dwyer,
by
Attorneys.

UNITED STATES PATENT OFFICE.

EDWARD DWYER, OF CLYMER, PENNSYLVANIA.

VALVE.

987,447.

Specification of Letters Patent.  Patented Mar. 21, 1911.

Application filed August 13, 1910. Serial No. 576,996.

*To all whom it may concern:*

Be it known that I, EDWARD DWYER, a citizen of the United States of America, residing at Clymer, in the county of Indiana and State of Pennsylvania, have invented certain new and useful Improvements in Valves, of which the following is a specification, reference being had therein to the accompanying drawing.

This invention relates to valves, and the object of the invention is to provide a valve with a detachable seat, and to obviate the necessity of using a stuffing box or packing in connection with a valve. To this end, I have devised a non-leakable valve consisting of comparatively few parts easily and quickly assembled, the wearing parts of the valve being made of a more indurate material than the remainder of the valve, thereby reducing the cost of the valve.

The invention will be hereinafter specifically described and then claimed, and reference will now be had to the drawing forming a part of this specification, wherein:

Figure 1 is a vertical sectional view of the valve, and Fig. 2 is a horizontal sectional view of the same.

In the drawings 1 denotes a cylindrical valve body having the upper end thereof provided with a peripheral flange 2. The valve body 1 has a smooth vertical bore 3 extending from the upper end thereof to the lower end of said body, the lower end of said bore having its diameter reduced to form two annular shoulders 4 and 5, the walls of the bore from the shoulder 4 to the lower end of the body being threaded, as at 6 and 7.

The valve body 1 has the side thereof provided with a water outlet extension 8 having the bore 9 thereof threaded, as at 10, to receive a water outlet pipe.

Detachably mounted upon the shoulder 5 is a valve seat or collar 11 threaded to engage the threads 6, the upper edge of said valve seat having diametrically opposed sockets 12 to receive a spanner wrench (not shown) employed for screwing the seat onto the shoulder 5.

Arranged in the bore 3 of the valve body 1 is a bushing 13 adapted to rest upon the annular shoulder 4, and this bushing is interiorly threaded, as at 14, to receive an exteriorly threaded valve plug 15. The bushing 13 is provided with an opening 16 to establish communication between the bore 9 of the extension 8 and the interior of the bushing. The valve plug 15 has the lower end thereof reduced, as at 17, to engage in the upper end of the collar 11, while the lower bottom edges of the plug seat upon the upper edges of the collar 11. Keyed or otherwise connected to the upper end of the plug, as at 18, is a valve stem 19 loosely mounted in the vertical sleeve 20 of a cap 21, said cap being secured to the flange 2 by bolts 22 and nuts 23. Mounted upon the upper end of the stem 19 is a hand wheel 24.

As shown in Fig. 1 of the drawings the valve is closed and with a water supply pipe connected to the lower end of the valve body, the pressure of water will be direct against the lower end of the plug 15, and on account of the multiplicity of threads used in connection with this plug, it will be impossible for the water to pass between the threads and reach the opening 16. The valve plug can be easily and quickly rotated to allow water to pass into the opening 16 and out of the extension 8.

To renew the valve seat or collar 11, the bushing 13 is removed, and the valve seat can be reground and replaced, or entirely renewed.

What I claim, is:

A valve comprising a body having a vertical bore formed therein, the lower end of said bore being reduced and the walls thereof threaded, the reduced end of said bore providing annular shoulders, an exteriorly threaded valve seat detachably mounted upon the lowermost shoulder of said valve body, an interiorly threaded bushing secured in said bore and engaging the upper of said shoulders and projecting upon a portion of the top edge of said seat, a water outlet extension carried by said valve body, said bushing having an opening formed therein establishing communication between said bushing and said extension, a valve plug adjustably mounted in said bushing and having the lower end thereof reduced to engage in said valve seat, a stem connected to the upper end of said valve plug, a cap detachably mounted upon the upper end of said valve body, and through which extends said stem, and means whereby the stem can be rotated.

In testimony whereof I affix my signature in the presence of two witnesses.

EDWARD DWYER.

Witnesses:
 WALTER H. ELLIS,
 W. F. NEELEY.